(12) United States Patent
Hauvespre et al.

(10) Patent No.: US 9,695,924 B2
(45) Date of Patent: Jul. 4, 2017

(54) MECHANICAL SYSTEM, INJECTION PUMP AND VALVE ACTUATOR COMPRISING SUCH A MECHANICAL SYSTEM AND MANUFACTURING METHOD

(71) Applicants: Benoît Hauvespre, Saint Etienne de Chigny (FR); Nicolas Berruet, Artannes sur Indre (FR); Charles Chambonneau, Joué lès Tours (FR); François Champalou, Chaumont-sur-Loire (FR); Samuel Viault, Saint-Antoine-du-Rocher (FR)

(72) Inventors: Benoît Hauvespre, Saint Etienne de Chigny (FR); Nicolas Berruet, Artannes sur Indre (FR); Charles Chambonneau, Joué lès Tours (FR); François Champalou, Chaumont-sur-Loire (FR); Samuel Viault, Saint-Antoine-du-Rocher (FR)

(73) Assignee: AKTIEBOLAGET SKF, Gothenborg (SE)

( * ) Notice: Subject to any disclaimer, the term of this patent is extended or adjusted under 35 U.S.C. 154(b) by 144 days.

(21) Appl. No.: 14/499,645

(22) Filed: Sep. 29, 2014

(65) Prior Publication Data
US 2015/0090205 A1    Apr. 2, 2015

(30) Foreign Application Priority Data

Sep. 27, 2013 (EP) ..................... 13186511

(51) Int. Cl.
*F01L 1/14* (2006.01)
*F16H 53/06* (2006.01)
(Continued)

(52) U.S. Cl.
CPC ............... *F16H 53/06* (2013.01); *F01L 1/04* (2013.01); *F01L 1/14* (2013.01); *F01L 1/143* (2013.01);
(Continued)

(58) Field of Classification Search
CPC ......... F16H 53/06; F01L 2107/00; F01L 1/16; F01L 1/143; F01L 1/14
See application file for complete search history.

(56) References Cited

U.S. PATENT DOCUMENTS 5,307,769 A    5/1994 Meagher
5,553,512 A *  9/1996 Harimoto ............... F01L 1/14
                                                    123/90.55
(Continued)

FOREIGN PATENT DOCUMENTS

DE          4331694 A1    3/1995
JP       2002332809 A    11/2002
(Continued)

*Primary Examiner* — Zelalem Eshete
(74) *Attorney, Agent, or Firm* — Bryan Peckjian; SKF USA Inc. Patent Dept.

(57) ABSTRACT

A mechanical system, comprising a tappet including a body, a support element defining two bores centered on a first axis, a pin comprising two opposite ends each adapted to be fitted in one of the two bores, and a roller element positioned between the two bores along the first axis and movable in rotation relative to the pin around the first axis. The support element is distinct from the body and fixed thereto, and the support element also comprises at least one antirotation device integrally formed thereto. The mechanical system can be integrated into an injection pump and/or a valve actuator.

19 Claims, 4 Drawing Sheets

(51) Int. Cl.
*F04B 1/04* (2006.01)
*F02M 37/06* (2006.01)
*F01L 1/04* (2006.01)
*F02M 59/10* (2006.01)

(52) U.S. Cl.
CPC .......... *F02M 37/06* (2013.01); *F02M 59/102* (2013.01); *F04B 1/0439* (2013.01); *F01L 2105/00* (2013.01); *F01L 2107/00* (2013.01); *Y10T 29/49295* (2015.01); *Y10T 29/49826* (2015.01); *Y10T 74/2107* (2015.01)

(56) References Cited

U.S. PATENT DOCUMENTS

| | | | |
|---|---|---|---|
| 7,497,157 B2* | 3/2009 | Aoki | F02M 47/027 |
| | | | 74/569 |
| 8,863,615 B2* | 10/2014 | Yabuuchi | F01L 1/143 |
| | | | 74/569 |
| 2008/0190237 A1* | 8/2008 | Radinger | F01L 1/143 |
| | | | 74/569 |
| 2011/0158835 A1* | 6/2011 | Yabuuchi | F01L 1/143 |
| | | | 417/471 |
| 2013/0340695 A1* | 12/2013 | Fujii | F01L 1/14 |
| | | | 123/90.48 |

FOREIGN PATENT DOCUMENTS

| | | |
|---|---|---|
| WO | 2010026463 A1 | 3/2010 |
| WO | 2013119214 A1 | 8/2013 |

\* cited by examiner

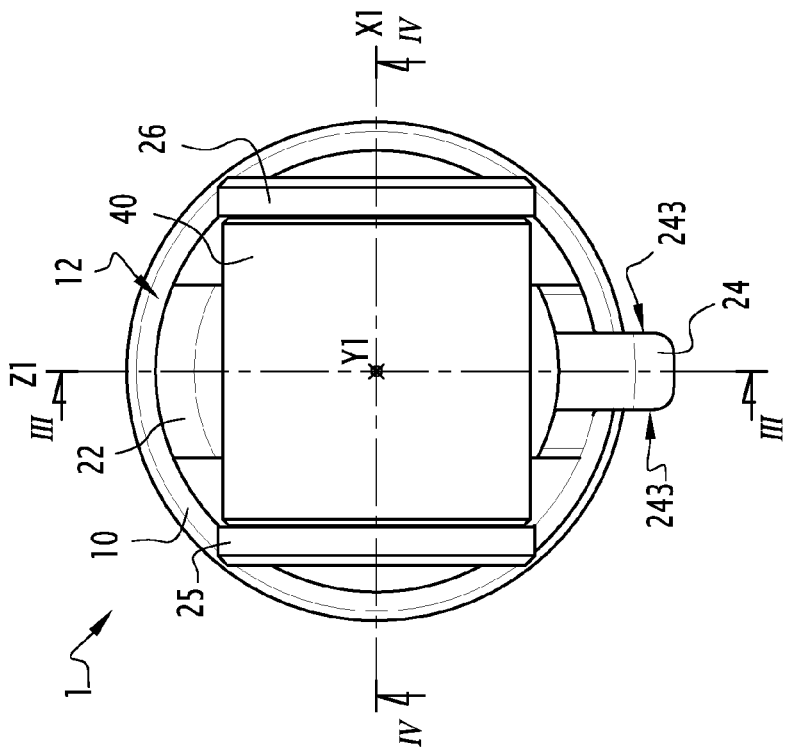
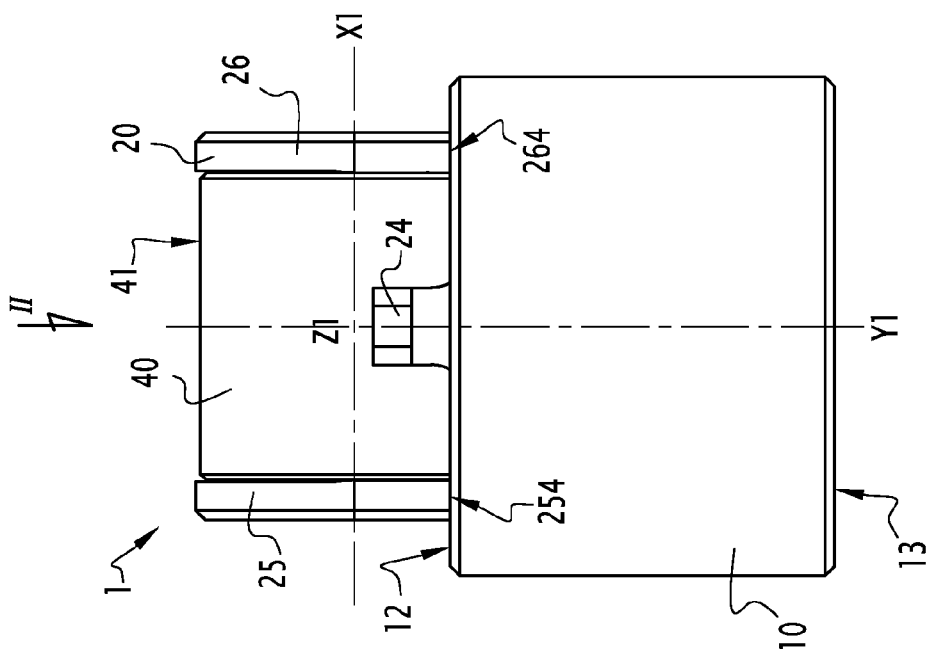

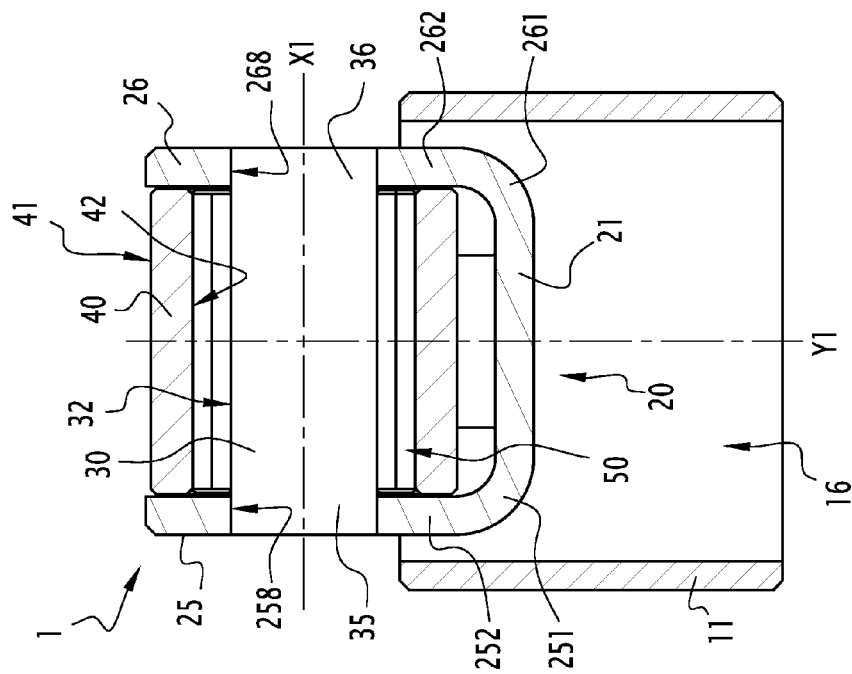
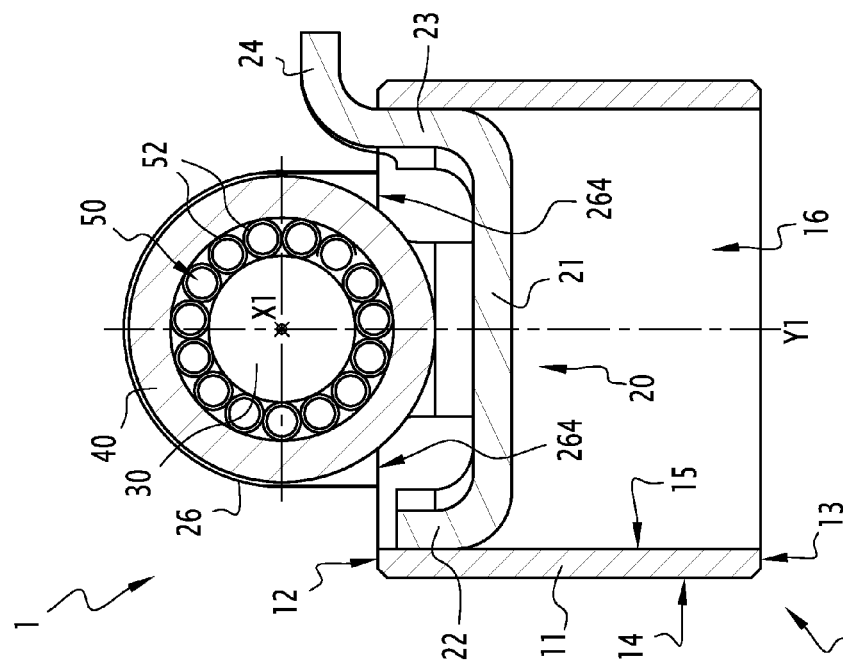

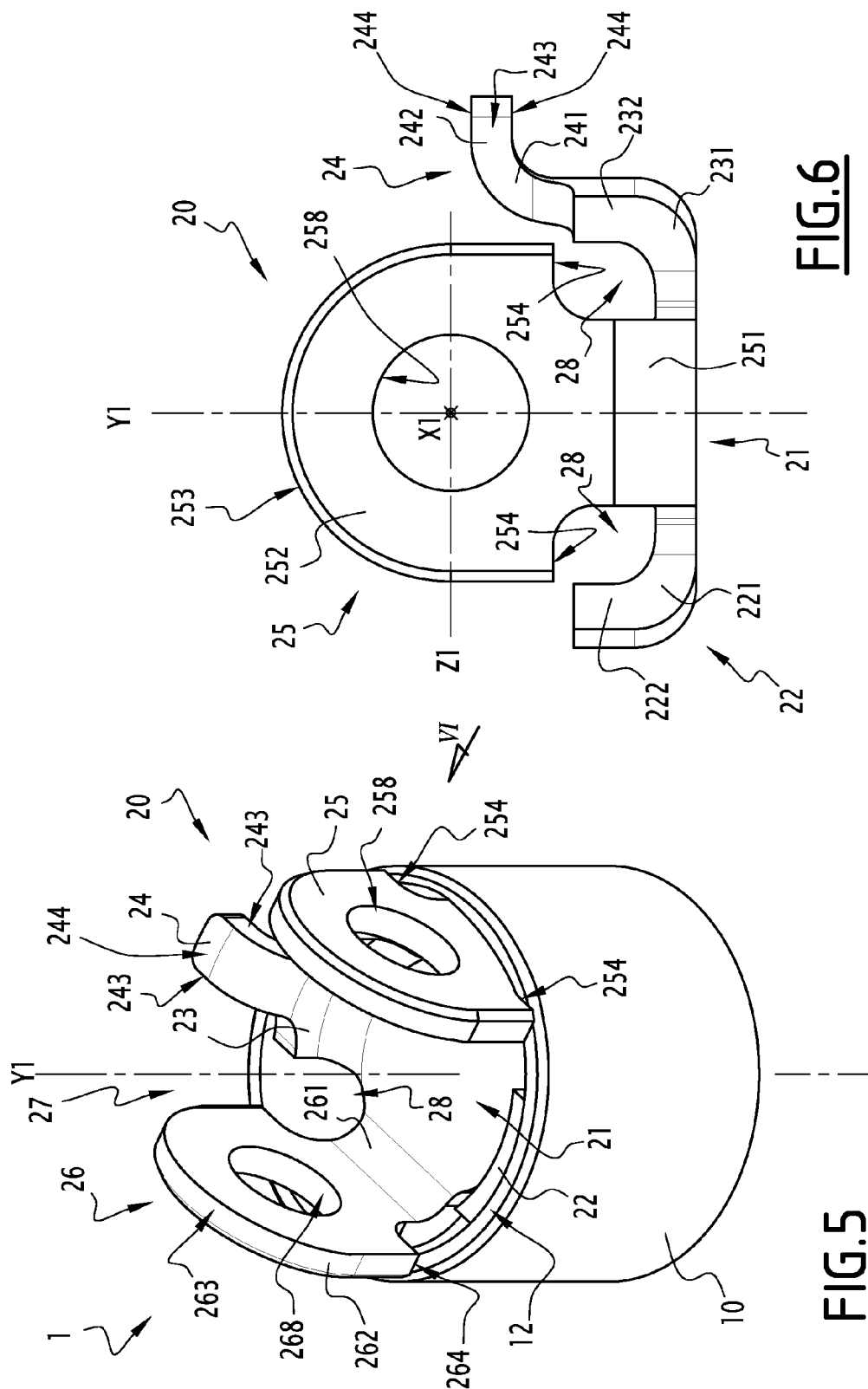

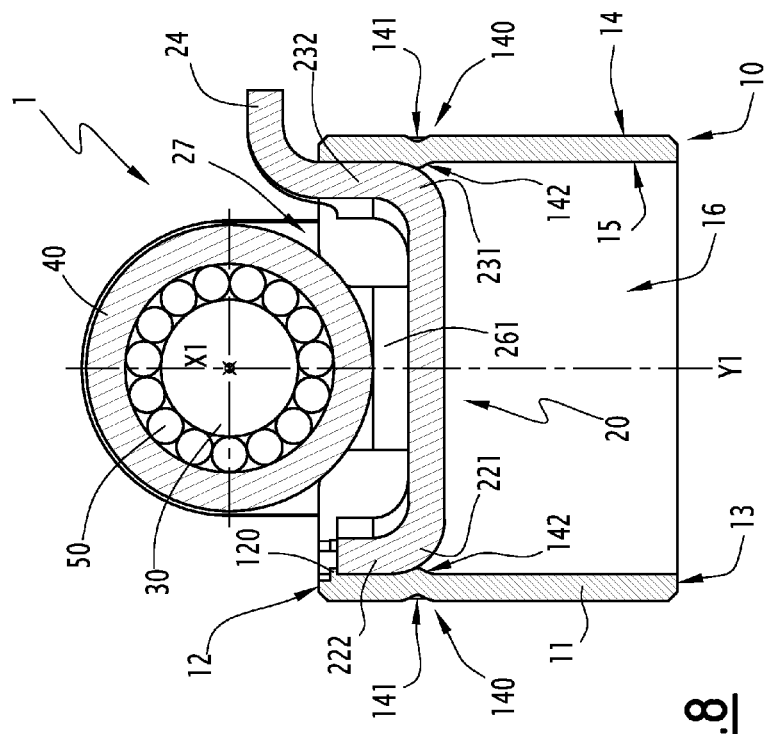
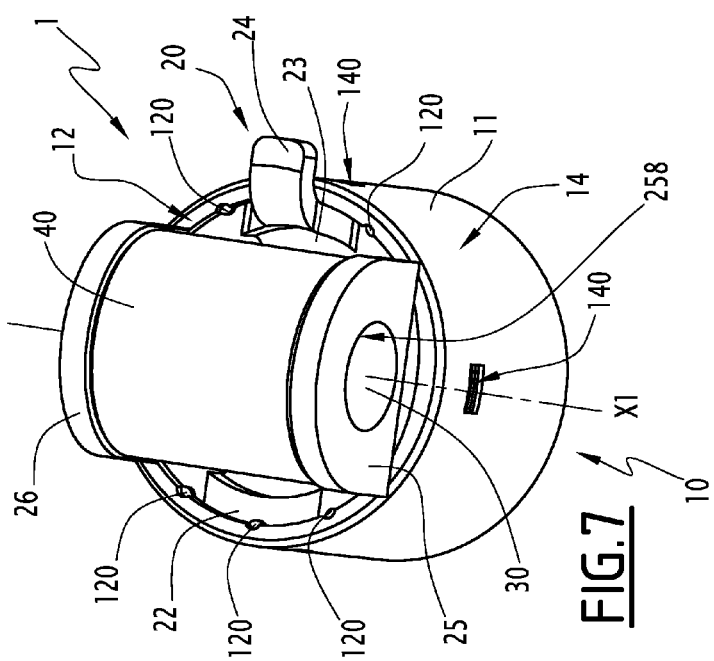

MECHANICAL SYSTEM, INJECTION PUMP AND VALVE ACTUATOR COMPRISING SUCH A MECHANICAL SYSTEM AND MANUFACTURING METHOD

CROSS REFERENCE TO RELATED APPLICATION

This is a National Stage application claiming the benefit of European Union Patent Application Number 13186518 filed on 27 Sep. 2013 (27.09.2013), which is incorporated herein by reference in its entirety.

TECHNICAL FIELD OF THE INVENTION

The invention concerns a mechanical system. The invention also concerns an injection pump and a valve actuator for a motor vehicle, by example for a gasoline engine car, each comprising such a mechanical system. The invention also concerns a method for manufacturing such a mechanical system.

BACKGROUND OF THE INVENTION

Classically, a cam follower belonging to an injection pump comprises at least a tappet, a roller and a pin in bronze or steel. The roller and the pin are centered on a transverse axis, while the tappet extends along a longitudinal axis. The tappet is formed with two lateral flanges, delimiting an intermediate gap between them and each comprising a cylindrical bore, possibly beveled. The roller is positioned in the intermediate gap, between both flanges and bores. The pin is fitted in the two bores, such that the roller is movable in rotation relative to the pin around its axis. The pin might be then caulked, in other words plastically deformed, on both opposite ends to create a mechanical connection by press-fit in the tappet bores.

When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

In practice, the angular orientation of the cam follower around its longitudinal axis induces the angular orientation of the transverse axis, pin and roller relative to this longitudinal axis. In case of incorrect orientation, the collaboration between roller and cam is improper and the roller rotation may be obstructed. In other words, an incorrect orientation around the longitudinal axis would cause malfunction of cam follower, injection pump and motor.

It is known to provide the cam follower with an antirotation function by fixing an additional part to the tappet. Documents WO-A-2010/048 968, U.S. Pat. No. 7,210,437 and US-A-2008/190 237 describe examples of such cam followers provided with an anti-rotation device. The device slides in a guide of a bore surrounding the tappet, thus ensuring correct orientation of the cam follower and preventing its accidental rotation around its longitudinal axis. However, that increases the number of subcomponents of these cam followers. Their assembly is made more complex and longer.

SUMMARY OF THE INVENTION

The aim of the invention is to provide an improved mechanical system, such as a cam follower, provided with an anti-rotation function.

To this end, the invention concerns a mechanical system, comprising a tappet including a body, a support element defining two bores centered on a first axis, a pin comprising two opposite ends each adapted to be fitted in one of the two bores, and a roller element positioned between the two bores along the first axis and movable in rotation relative to the pin around the first axis.

According to the invention, the support element is distinct from the body and fixed thereto, and the support element also comprises at least one antirotation device integrally formed thereto.

Thanks to the invention, the mechanical system is provided with anti-rotation function and a pin support function on the same part, without using an additional part. Design of the mechanical system and its assembly are simplified. Position of the antirotation device relative to the pin axis and is more accurate. The antirotation device prevents the support element from rotating in a bore surrounding this support element, which is for example the tappet of a cam follower.

According to further aspects of the invention which are advantageous but not compulsory, such a mechanical system may incorporate one or several of the following features:

The support element is clamped inside the body.
The support element is force-fitted inside the body.
The support element is mounted with a play inside the body, then fixed to the body, by example by crimping, welding or soldering.
The support element is fixed to the body by local deformations of the body.
The mechanical system comprises at least two antirotation devices integrally formed with the support element.
The support element comprises at least one surface resting against at least one surface of the body, such that a load applied on the roller element is at least partly transmitted via these surfaces from the support element to the body.
The body is made of synthetic material, for example of polyamide or polyether-ether-ketone.
The body is made of metal, for example of steel.
The support element is made of metal, for example of steel, and stamped to form the antirotation device and flanges including the bores.
The mechanical system comprises a bearing interposed between the pin and the roller element.
The mechanical system constitutes a cam follower, the tappet is movable along a translation axis perpendicular to the first axis and the roller element is adapted to roll on an outer surface of a cam.

The invention also concerns an injection pump for a motor vehicle, equipped with a mechanical system as mentioned here-above.

The invention also concerns a valve actuator for a motor vehicle, equipped with a mechanical system as mentioned here-above.

The invention also concerns a method for manufacturing a mechanical system as mentioned here-above, wherein the antirotation device is integrally formed with the support element by stamping, then the support element is fixed to the body by clamping, crimping, welding and/or soldering.

BRIEF DESCRIPTION OF THE DRAWINGS

The invention will now be explained in correspondence with the annexed figures, as an illustrative example, without restricting the object of the invention. In the annexed figures:

FIG. 1 is a side view of a mechanical system according to the invention, of the cam follower type, comprising a tappet, an insert and a roller;

FIG. 2 is a top view, along arrow II of FIG. 1;

FIGS. 3 and 4 are a sectional views, respectively along line and along line IV-IV of FIG. 2, showing a pin and a bearing supporting the roller;

FIG. 5 is a perspective view showing the tappet and the insert belonging to the mechanical system of FIGS. 1 to 4, without the pin, the bearing and the roller;

FIG. 6 is a side view of the insert, along arrow VI of FIG. 5;

FIG. 7 is a perspective view, showing a mechanical system according to a second embodiment of the invention; and FIG. 8 is a sectional view similar to FIG. 4, showing the mechanical system of FIG. 7.

DETAILED DESCRIPTION OF SOME EMBODIMENTS

The mechanical system 1 represented on FIGS. 1 to 6 is of the cam follower type, adapted to equip an injection pump for a motor vehicle, preferably for a gasoline engine car, not shown.

The system 1 comprises a tappet 10, an insert 20, a pin 30, a roller 40 and a bearing 50. Pin 30, roller 40 and bearing 50 are centered on a transverse axis X1, while tappet 10 is centered on a longitudinal axis Y1. Axis X1 and Y1 are perpendicular. In the embodiment of FIGS. 1 to 6, the bearing 50 consists of needles 52. Alternatively, it may consist of cylindrical rollers or a sliding bushing.

Tappet 10 comprises a cylindrical body 11 centered on axis Y1 and extending between an upper edge 12 and a lower edge 13. Body 11 has a cylindrical outer surface 14 and a cylindrical inner bore 15 delimiting a cavity 16 inside tappet 10. This cavity 16 is adapted to receive a plunger or a push rod, not shown, following tappet 10 along axis Y1. This cavity 16 is also adapted to receive insert 20. Tappet 10 is movable back and forth along axis Y1, in a non-represented bore belonging to the injection pump or motor, with surface 14 sliding in this bore. Tappet 10 can be made of synthetic material, by example polyamide 6,6 (PA) or polyether-ether-ketone (PEEK), or made of metal, by example steel. Material of the tappet 10 is chosen resistant to oil and its additives and temperature variations.

Insert 20 comprises a central core 21 and four lateral tab 22, 23, 25 and 26 extending from central portion 21 opposite axis Y1, then partly along a direction parallel to axis Y1. Each tab 22, 23, 25 and 26 comprises a curved portion, respectively 221, 231, 251 and 261, extending from core 21 opposite axis Y1 then curved from radial direction to upper direction; and an axial portion, respectively 222, 232, 252 and 262, extending along a direction parallel to axis Y1. Portions 222 and 223 are curved around axis Y1 and adapted to rest against bore 15 of tappet 10. Portion 252 is a lateral flange comprising a curved upper surface 253, two plane lower surfaces 254 and a cylindrical bore 258. Portion 262 is a lateral flange comprising a curved upper surface 263, two plane lower surfaces 264 and a cylindrical bore 268.

Insert 20 forms a support element for pin 30, roller 40 and bearing 50. Specifically, bores 258 and 268 of insert 20 are adapted to receive pin 30, on which roller 40 and bearing 50 are mounted. When insert 20 is fixed to tappet 10, the two lateral flanges 252 and 262 extend parallel to axis Y1 in a bifurcated manner, on both side of axis Y1, with surfaces 254 and 264 resting against edge 12. The flanges 252 and 262 delimit between them an intermediate gap 27. Both bores 258 and 268 extend through flanges 252 and 262 along same axis X1 and have the same diameter.

Moreover, according to the invention, an antirotation device 24 is integrally formed with insert 20. Device 24 is a pin protruding from tab 23 along a direction parallel to an axis Z1 perpendicular to axes X1 and Y1. Pin 24 has a curved portion 241 and a radial portion 242. Portion 241 extends from tab 23 along axis Y1 then is curved opposite axis Y1 along axis Z1. Portion 242 extends along axis Z1, opposite axis Y1. Portion 242 comprises two lateral faces 243 and upper and lower faces 244. When system 1 is operated, pin 24 and more precisely faces 243 cooperates with a non-represented guiding groove, formed in the bore surrounding tappet 10. Thus, pin 24 prevents tappet 10 from rotating in this bore around axis Y1. Depending on configuration of the injection pump, lower and upper faces 244 of pin 24 may form end stops adapted to abut against extremities of the guiding groove or of another part.

Insert 20 is preferably made of metal, by example steel such as XC75. Material of insert 20 is chosen resistant to oil flow, temperature variations and mechanical strains. Insert 20 is preferably formed by stamping. In other words, elements 21 to 26 are delimited in a plane metal sheet, and then formed by stamping. Holes 28 are delimited between portions 221, 231, 251 and 261, in order to save material and avoid cracks when insert 20 is deformed by stamping. Insert 20 is clamped inside body 11, preferably force-fitted. Alternatively, insert 20 is mounted inside body 11 with a play radially to axis Y1, and then fixed to body 11, for instance by crimping, welding or soldering.

Pin 30 comprises a cylindrical surface 32 extending between two pin ends 35 and 36. In practice, pin ends 35 and 36 are adapted to be caulked, respectively in bores 258 and 268. Pin 30 is made of metal, such as steel or bronze. If made of steel, pin 30 is preferably subjected to heat treatment before the caulking step. More precisely, pin ends 35 and 36 may be subjected to an induction hardening step just before the caulking step.

Roller 40 has an outer cylindrical surface 41 and an inner cylindrical bore 42 centered on axis X1. Surface 41 is intended to bear against an outer surface of a non-represented cam, synchronized with the internal combustion engine camshaft. Surface 41 is preferably subjected to heat treatment to increase its resistance to load and/or wear.

Needle bearing 50 comprises a series of needles 52 extending parallel to axis X1 and distributed regularly around axis X1. Needles 52 are interposed between surface 32 of pin 30 and surface 42 of roller 40.

During the assembly of system 1, roller 40 and rolling bearing 50 are positioned before pin 30 in the intermediate gap 27 between the two flanges 252 and 262. Then pin 30 is inserted inside bores 258 and 268 of insert 20 and inside rolling bearing 50. Finally pin ends 35 and 36 are caulked in bores 258 and 268. At this stage, roller 40 is movable in rotation relative to pin 30 around axis X1. Pin axis, roller axis and rolling bearing axis merge with axis X1. Roller 40 is then adapted to roll, more precisely its surface 41 can roll, on an outer surface of the non-represented cam.

In practice, the load applied on surface 41 of roller 40 is transmitted to rolling bearing 50, then to pin 30, then to insert 20, then to tappet 10 and to the non-represented plunger or push rod located inside cavity 16 of tappet 10. Core 21 of insert 20 rests in contact against this part. The surfaces 254 and 264 rest in contact against the surface of edge 12, such that the load applied on the roller 40 is at least partly transmitted via these surfaces from the support element 20 to the body 11. However, thanks to the invention, most of the load applied on roller 40 is received by insert 20 instead of tappet 10, then is transmitted to the plunger or push rod. Tappet 10 slides back and forth but bears few mechanical strains along axis Y1.

According to the invention, insert 20 has three different functions. Insert 20 forms a support element for pin 30. Insert 20 comprises an antirotation device 24 integrally formed thereto. Insert 20 is in contact with the plunger or push rod located inside cavity 16 for load transmission.

FIGS. 7 and 8 show a mechanical system 1 according to a second embodiment of the invention. Only the differences with respect to the first embodiment are described hereafter.

Body 11 comprises local deformations 120 and 140 for fixing insert 20 to tappet 10. Deformations 120 are made after deformations 140. On the example of FIGS. 7 and 8, body 11 includes five deformations 120 distributed on edge 12 and four deformation 140 regularly distributed around axis Y1. Deformations 140 may be made by punching outer surface 14 of body 11, thus including a recess 141 formed on outer surface 14 and a protrusion 142 formed on inner surface 15 toward axis Y1. Portions 221, 231, 251 and 261 of insert 20 come in bearing contact with protrusion 142 inside cavity 16, thus preventing insert 20 to move inside cavity 16 toward edge 13. Deformations 140 can be made before or after mounting insert 20 inside body 11. Deformations 120 are made by punching material of edge 12 against insert 20 along axis Y1, thus preventing insert 20 to move outside cavity 16 at edge 12. Thanks to deformations 120 and 140, insert 20 is fixed to body 11 by crimping.

Other non-shown embodiments can be implemented without leaving the scope of the invention. For example, tappet 10, insert 20 and/or roller element 40 may have different configurations, by example depending on the intended application of system 1. According to another example, number, shape and position of device(s) 24 may vary without leaving the scope of the invention.

According to a non-shown embodiment, system 1 may constitute a rocker arm, wherein the support element 10 is not a tappet and wherein the roller element 40 is secured to an arm and a tappet, for example acting on a valve stem.

According to another non-shown embodiment, system 1 comprises no rolling bearing 50, while pin 30 and roller 40 form together a plain bearing. Indeed, in heavy duty applications such as in diesel truck engines, there is a lack of space and/or excessive loads involved for the implementation of the rolling bearing 50, thus justifying the use of a plain bearing. Alternatively, bearing 50 may be replaced by a bushing.

According to another non-shown embodiment, system 1 comprises two antirotation devices 24. By example, both antirotation devices 24 may be formed on tab 23 and be aligned parallel to axis Y1, so that they can be positioned in the same groove formed in bore surrounding tappet 10. Alternatively, the two antirotation devices 24 may be diametrically opposed relative to axis Y1, with a first device formed on tab 23 and a second device formed on tab 24.

Whatever the embodiment, system 1 is such that the support element 20 is distinct from the body 11 and fixed thereto. Moreover, the support element 20 comprises at least one antirotation device 24 integrally formed thereto. This antirotation device 24 is adapted to fit and slide in a groove surrounding the body 11.

In addition, technical features of the different embodiments can be, in whole or part, combined with each other. Thus, the mechanical system 1 and its manufacturing method can be adapted to the specific requirements of the application.

The invention claimed is:

1. A mechanical system, comprising:
   a tappet including a body, the body having a cylindrical shape and defining a cylindrical cavity extending longitudinally therethrough between an upper tappet body edge and a lower tappet body edge,
   a support element defining two bores centered on a first axis, the support element comprising a core extending between the two bores,
   a pin comprising two opposite ends each adapted to be fitted in one of the two bores such that the pin does not contact the tappet, and
   a roller element positioned between the two bores along the first axis and movable in rotation relative to the pin around the first axis,
   wherein the support element is distinct from the body and fixed thereto such that there is no relative movement therebetween, and
   the core being configured to form a solid barrier between the roller element and the lower tappet body edge, the support element being configured such that the solid barrier formed by the core is positioned within the cavity and spaced from the upper tappet body edge such that a portion of the roller element is located within the cavity, wherein the support element also comprises at least one antirotation device integrally formed thereto.

2. The mechanical system according to claim 1, wherein the support element is clamped inside the body.

3. The mechanical system according to claim 2, wherein the support element is force-fitted inside the body.

4. The mechanical system according to claim 1, wherein the support element is mounted with a play inside the body, then fixed to the body.

5. The mechanical system according to claim 1, wherein the support element is mounted with a play inside the body, then fixed to the body by one of: crimping, welding or soldering.

6. The mechanical system according to claim 4, wherein the support element is fixed to the body by local deformations of the body.

7. The mechanical system according to claim 1, further comprising at least two antirotation devices integrally formed with the support element.

8. The mechanical system according to claim 1, wherein the support element comprises at least one surface resting against at least one surface of the body, such that a load applied on the roller element is at least partly transmitted via these surfaces from the support element to the body.

9. The mechanical system according to claim 1, wherein the body is made of a synthetic material.

10. The mechanical system according to claim 1, wherein the body is made of one of polyamide or polyether-etherketone.

11. The mechanical system according to claim 1, wherein the body is made of metal.

12. The mechanical system according to claim 1, wherein the body is made of steel.

13. The mechanical system according to claim 1, wherein the support element is made of metal, and stamped to form the antirotation device and flanges including the bores.

14. The mechanical system according to claim 1, wherein the support element is made of steel, and stamped to form the antirotation device and flanges including the bores.

15. The mechanical system according to claim 1, further comprising a bearing interposed between the pin and the roller element.

16. The mechanical system according to claim 1, wherein it constitutes a cam follower, wherein the tappet is movable along a translation axis perpendicular to the first axis and wherein the roller element is adapted to roll on an outer surface of a cam.

17. An injection pump for a motor vehicle comprising:
a mechanical system, wherein the mechanical system includes:
a tappet including a body, the body having a cylindrical shape and defining a cylindrical cavity extending longitudinally therethrough between an upper tappet body edge and a lower tappet body edge,
a support element defining two bores centered on a first axis, the support element comprising a core extending between the two bores,
a pin comprising two opposite ends each adapted to be fitted in one of the two bores such that the pin does not contact the tappet, and
a roller element positioned between the two bores along the first axis and movable in rotation relative to the pin around the first axis,
wherein the support element is distinct from the body and fixed thereto such that there is no relative movement therebetween,
the core being configured to form a solid barrier between the roller element and the lower tappet body edge, the support element being configured such that the solid barrier formed by the core is positioned within the cavity and spaced from the upper tappet body edge such that a portion of the roller element is located within the cavity, wherein the support element also comprises at least one antirotation device integrally formed thereto,
wherein the mechanical system is a subassembly integrated into the injection pump.

18. A valve actuator for a motor vehicle comprising:
a mechanical system, wherein the mechanical system includes:
a tappet including a body, the body having a cylindrical shape and defining a cylindrical cavity extending longitudinally therethrough between an upper tappet body edge and a lower tappet body edge,
a support element defining two bores centered on a first axis, the support element comprising a core extending between the two bores,
a pin comprising two opposite ends each adapted to be fitted in one of the two bores such that the pin does not contact the tappet, and
a roller element positioned between the two bores along the first axis and movable in rotation relative to the pin around the first axis,
the core being configured to form a solid barrier between the roller element and the lower tappet body edge, the support element being configured such that the solid barrier formed by the core is positioned within the cavity and spaced from the upper tappet body edge such that a portion of the roller element is located within the cavity, wherein the support element is distinct from the body and fixed thereto such that there is no relative movement therebetween,
wherein the support element also comprises at least one antirotation device integrally formed thereto,
wherein the mechanical system is a subassembly integrated into the valve actuator.

19. A method for manufacturing a mechanical system comprising steps of:
obtaining components of the mechanical system, the components including:
a tappet including a body, the body having a cylindrical shape and defining a cylindrical cavity extending longitudinally therethrough between an upper tappet body edge and a lower tappet body edge,
a support element defining two bores centered on a first axis, the support element comprising a core extending between the two bores,
a pin comprising two opposite ends each adapted to be fitted in one of the two bores such that the pin does not contact the tappet, and
a roller element,
wherein the support element is distinct from the body and fixed thereto such that there is no relative movement therebetween,
the core being configured to form a solid barrier between the roller element and the lower tappet body edge, the support element being configured such that the solid barrier formed by the core is positioned within the cavity and spaced from the upper tappet body edge such that a portion of the roller element is located within the cavity, wherein the support element also comprises at least one antirotation device integrally formed thereto;
assembling the roller element to be movable in rotation relative to the pin around the first axis; and
wherein the antirotation device is integrally formed with the support element by stamping, then the support element is fixed to the body by at least one of: clamping, crimping, welding and soldering.

* * * * *